United States Patent [19]

Hutchison et al.

[11] Patent Number: 5,181,688

[45] Date of Patent: Jan. 26, 1993

[54] MECHANISM FOR COUPLING A COMPONENT WITH A VEHICLE

[75] Inventors: Wayne R. Hutchison, Mayville; Jon M. Patterson, Wauwatosa; Terry D. Hardesty, Columbus; Richard D. Teal, Horicon; Eugene G. Hayes, Beaver Dam, all of Wis.; Michael J. Coffey, Sanford; Earl T. Moore, Midland, both of Mich.

[73] Assignee: Deere & Company, Moline, Ill.

[21] Appl. No.: 715,158

[22] Filed: Jun. 14, 1991

[51] Int. Cl.⁵ .............................................. F16M 1/00
[52] U.S. Cl. ................................... 248/680; 180/312; 180/344
[58] Field of Search ............... 248/647, 680, 500, 507, 248/560; 180/312, 291, 344

[56] References Cited

U.S. PATENT DOCUMENTS

| | | | |
|---|---|---|---|
| 1,731,837 | 10/1929 | Wood | 180/291 |
| 1,738,532 | 12/1929 | Harbour | 180/291 X |
| 2,365,609 | 12/1944 | Wahlberg | 180/312 X |
| 2,817,557 | 12/1957 | Reynolds | 180/312 X |
| 2,954,998 | 10/1960 | Kushler et al. | 180/312 X |
| 4,077,485 | 3/1978 | Bonora et al. | 180/312 X |
| 5,000,428 | 3/1991 | Thorn | 180/312 X |

Primary Examiner—David M. Purol

[57] ABSTRACT

A mechanism for coupling vehicle components to a vehicle frame made of a plastic material. A bolt is received by generally aligned openings defined by the frame and the component, and a first nut threaded onto the bolt securely presses the frame and component together. A spacer or second nut carried by the bolt between the first nut and the component is positioned within the opening in the frame. The spacer is slightly smaller in depth than the frame member, and allows the frame to become slightly compress. The spacer limits the travel of the nut on the threads, thereby preventing the frame from being compressed beyond the elastic range of deflection. A module plate having the vehicle engine thereattached is carried between the second nut and the vehicle component. The second nut keeps the module plate and the component securely coupled together when the first nut is removed from the bolt, such that the module plate, the engine and the vehicle component can be removed from the frame as a single unit.

30 Claims, 2 Drawing Sheets

5,181,688

MECHANISM FOR COUPLING A COMPONENT WITH A VEHICLE

BACKGROUND OF THE INVENTION

1. Field of the Invention

The invention relates to mechanisms for coupling vehicle components such as engines and transaxles to vehicle frames.

2. Description of the Related Art

Conventional lawn vehicles are provided with an engine and other vehicle components that must be supported or coupled with the vehicle frame. A metal or steel vehicle frame is typically utilized, and attachment mechanisms such as bolts are often used for coupling the components to the frame. The metalic frame material is rigid enough to withstand the large compressive force applied by the bolt mechanism.

However, it may be desirable to provide a vehicle having a frame made of a plastic or composite material such that the engine and other vehicle components must be coupled to the plastic frame. These plastic or composite materials will behave elastically within an initial range of stress. If the given stress is high enough, then the plastic material will deform plastically or permanently. Furthermore, plastic or composite materials show properties which are time dependent under load. They can flow under a constantly applied given load (ie. creep) or they can relax under a given deflection (ie. stress relaxation). There are stresses high enough within the elastic range that, when applied to the plastic material over an extended period of time, will cause the material to undergo permanent deflection over time. The load at which the plastic will begin to creep after a period of time is dependent on the particular material used, the time of exposure to the load, the temperature, and other operating conditions. The load at which the plastic will begin to creep after a period of time is dependent on the particular material used, the time of exposure to the load, the temperature, and other operating conditions.

When plastic material is compressed away from conventional bolt connections, the stress within the plastic material may decrease or relax over a period of time if the bolt is not retightened against the plastic. If the bolt connection is retightened against the plastic, then the plastic or composite may continue to flow or creep away from the bolt connection over time.

Since plastic material can be squeezed away from the bolt connection, the thickness of the material can decrease at the location of the bolt. The frame can become weaker as the plastic material continues to flow away from the bolt. The frame may become so weak at the connection point that the frame may fail or the component may break away from the frame.

Many operators do not possess the tools required to measure the torque applied to a bolt. Therefore, a user who has removed a conventional bolt from a plastic frame is capable of applying an amount of torque to the bolt that will cause the plastic to deform non-elastically, or to creep over time.

Therefore, it would be desirable to provide a mechanism for coupling a component to a vehicle having a frame made of a plastic or composite material. It would be desirable for such a mechanism to prevent the plastic material from being compressed into a non-elastic range of stress. Furthermore, it would be desirable for such a mechanism to prevent the plastic material from undergoing stress high enough within the elastic range to cause the material to creep. It would be desirable for the plastic material to remain sufficiently strong to withstand the loads transferred from the component.

SUMMARY OF THE INVENTION

The preferred embodiment of the present invention provides a mechanism for coupling vehicle components such as a transaxle to a vehicle frame made of a plastic or composite material. A bolt is received by generally aligned openings defined by the frame and the component. A clamp plate and first nut threaded onto the bolt securely press the frame and component together. A spacer or second nut carried by the bolt between the first nut and the component is positioned within the opening in the frame. The spacer is slightly smaller in depth than the frame member, and allows the frame to become slightly compressed. The spacer limits the travel of the nut on the threads, thereby preventing the frame from being compressed between the clamp plate and component beyond an elastic range of deflection. Furthermore, the spacer prevents the plastic from being stressed to a point whereat the plastic will creep over a period of time. A module plate having the vehicle engine thereattached is carried between the second nut and the vehicle component. The second nut keeps the module plate and the component securely coupled together when the first nut is removed from the bolt, such that the module plate, the engine and the vehicle component can be removed from the frame as a single unit.

DESCRIPTION OF THE PREFERRED EMBODIMENT

Figure 1:
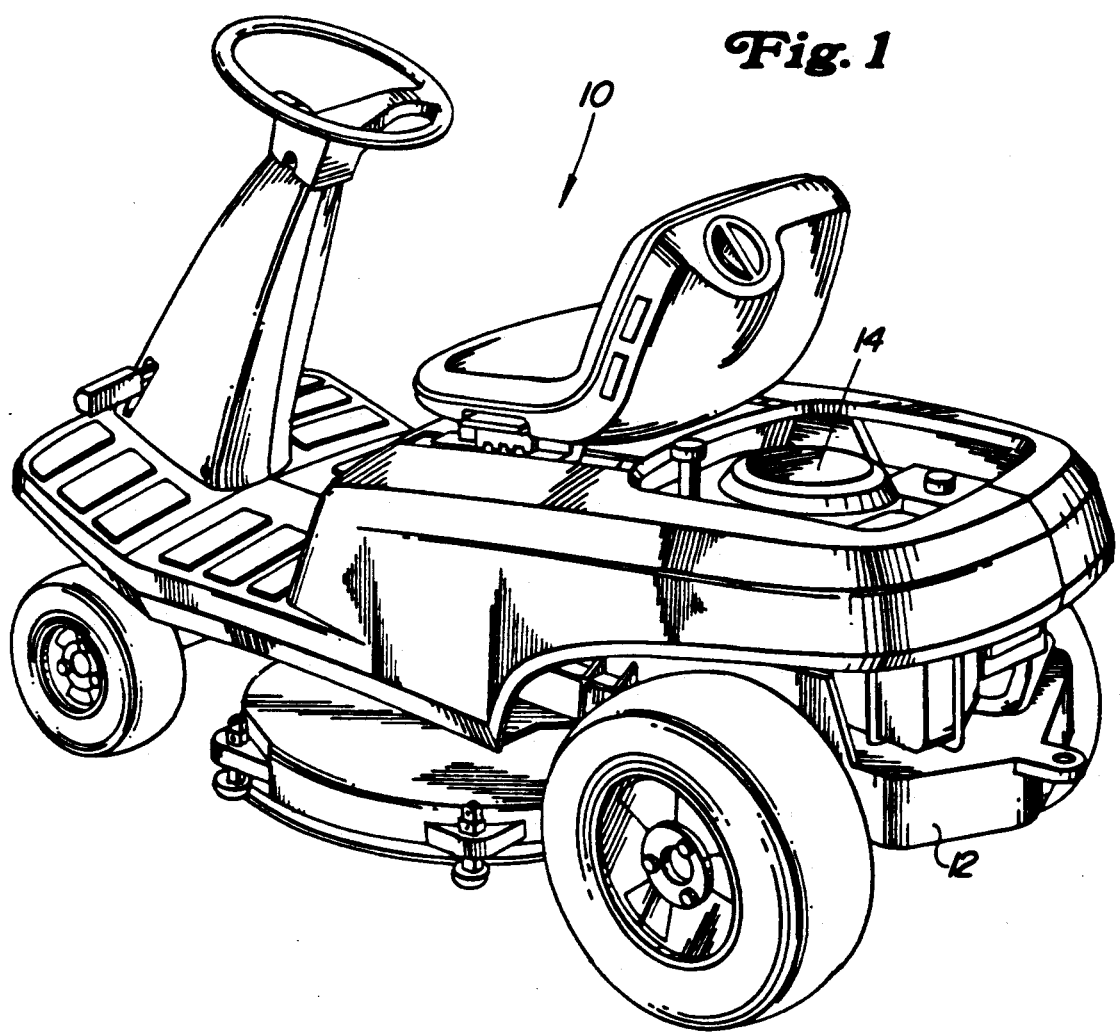
FIG. 1 is a perspective view of a vehicle having a frame made of a plastic material and with which the present invention may be used.
Figure 2:
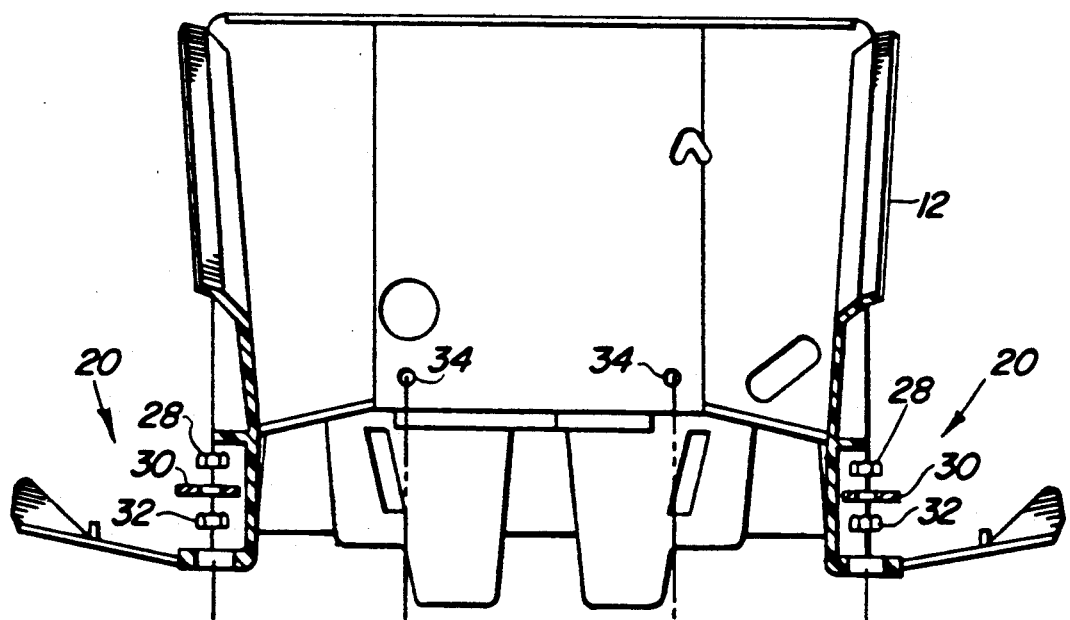
FIG. 2 is an exploded view showing the vehicle frame, the plate member and the attachment according to the present invention.
Figure 3:
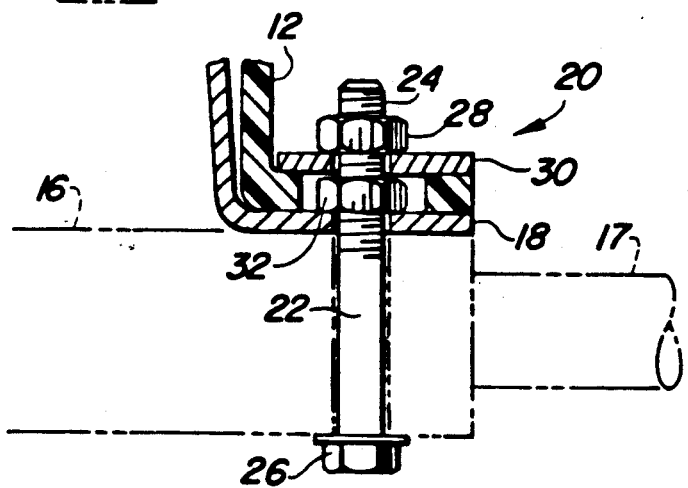
FIG. 3 is an enlarged view of the assembled attachment mechanism according to the preferred embodiment of the present invention.

Referring now to FIG. 1, there is shown a vehicle 10 having a frame 12 made of a plastic or composite material. The vehicle 10 is provided with an engine 14 and other components such as a transaxle 16 having an axle 17. As seen in FIG. 2, a module plate member 18 is provided having the transaxle 16 thereattached. The engine 14 is carried on top of the module plate 18 and within an engine compartment defined by the frame 12. The module plate 18 and transaxle 16 are coupled beneath the rear portion of the frame 12, and act to support the rear portion of the vehicle 10. A coupling mechanism 20, as best seen in FIG. 3, acts to couple the module plate 18 to the frame 12. A tension member or bolt 22 having a threaded portion 24 and a head 26 is received by openings formed in the transaxle 16, module plate 18 and frame 12. First and second nuts 28 and 32 are positioned on the threads 24 of the bolt 22 during operation. During the process of assembly, the bolt 22 is first positioned within the openings in the transaxle 16 and module plate 18, and the second nut 32 is tightened down on the bolt 22 to couple the transaxle 16 and the module plate 18 together. The bolt 22 must then be positioned within the opening provided in the frame 12, and a clamp plate 30 is placed on the bolt 22. The first nut 28 is then tightened down on the bolt 22 to secure the frame 12 with the module plate 18 and transaxle 16. Therefore, the clamp plate 30, frame 12, second nut 32, module plate 18 and transaxle 16 are in compression or clamped securely between the first nut 28 and the head 26 of the bolt 22.

The second nut or spacer 32 is positioned within the opening defined by the frame 12. The second nut 32 presses or clamps the module plate 18 and transaxle 16 together against the bolt head 26. When the engine 14 and transaxle 16 are to be removed from the frame 12 for service, the first nut 28 and clamp plate 30 can be removed from the bolt 22. The frame 12 can then be lifted from the module plate 18. The second nut 32 remains tightly threaded on the bolt 22 to maintain the module plate 18 and transaxle fixed together. The engine 14, module plate 18 and transaxle 16 can thereby be removed from the frame 12 as a single unit.

The second nut 32 also prevents the frame 12 from being over-compressed or over-stressed. The second nut 32 is positioned within the opening defined by the frame 12 and is in abutment with the module plate 18. The depth of the second nut 32 in the direction of the axis of the bolt 22 is slightly smaller than the thickness of the frame 12 at that location. When the first nut 28 is tightened down onto the bolt 22, the clamp plate 30 presses down on the plastic material of the frame 12. The frame material will become slightly compressed to the point where the clamp plate 30 abuts the second nut 32. At this point the second nut 32 blocks the clamp plate 30 from further compressing the frame material against the module plate 18. The size of the second nut 32 relative to the thickness of the material prevents or blocks the clamp plate 30 from compressing the frame material against the module plate 18 into a non-elastic or plastic range of deflection. The compression of the frame material between the clamp plate 30 and the module plate 18 therefore remains elastic, and the material will spring back to its original thickness when the first nut 28 is removed. Furthermore, the second nut limits stress in the plastic material to such an extent that stress relaxation and creep are eliminated. Therefore, the frame material in compression at the location of the coupling 20 is hindered from creeping, flowing or being compressed out from between the clamp plate 30 and module plate 18. The frame 12 thereby continuously provides structure to which the transaxle 16 and module plate 18 can be securely attached. Since creep is eliminated, the plastic material of the frame 12 will continuously and elastically press against the clamp plate 30 and module plate 18, and the frame 12 will remain snuggly held between the clamp plate 30 and the module plate 18. The coupling according to the preferred embodiment thereby prevents the frame material from being over-compressed.

The first nut 28 can be removed from the bolt 22 to remove the engine 14 or transaxle 16 for service. To reattach the engine 14 and transaxle 16 to the frame the operator must then retighten the first nut onto the bolt 22. The present invention prevents the operator from over-torquing the first nut 28 when reattaching the components 14 and 16 after service.

The preferred embodiment of the present invention provides a pair of couplings 20 along each side of the vehicle 10 near the axle 17. Each pair of couplings 20 utilizes only a single clamp plate 30 that extends between each bolt 22. The module plate 18 is also coupled to the vehicle 10 at two forward locations 34 for transferring torque loads to the frame 12. The forward attachment locations 34 also utilize the coupling 20 according to the present invention.

The preferred embodiment provides a bolt 22 that receives first and second nuts 28 and 32, and that includes a head portion 26. However, other structures can be provided according to the present invention. For example, a first alternative would provide a rod having threads formed along its entire length. The threads could receive first and second nuts 28 and 32 as provided by the preferred embodiment, and could receive an additional nut that would act as the head portion 26 of the bolt 22 of the preferred embodiment. A second alternative embodiment of the present invention would provide a rod member having a central portion of larger radius than the end portions. The central portion would act as the spacer described above in the preferred embodiment. The end portions would each have a nut threaded thereon that would act as the first nut 28 and bolt head 26, respectively, of the preferred embodiment. Since the first and second alternative embodiments provide a removable nut threaded onto a rod that acts as the bolt head 26 of the preferred embodiment, the nut could be removed to allow the transaxle 16 to be removed from the vehicle 10 without requiring the removal of the module plate 18 or engine 14.

I claim:

1. A mechanism, comprising:
    a frame member made at least partially of a plastic material, and to which a component may be coupled, said component and frame defining respective generally aligned openings,
    a tension member received by the openings in the component and frame, said tension member including a clamping means for operatively pressing the frame and component together securely, and
    spacer means rigidly coupled with the tension member for securely remaining in position with respect to the tension member when the clamping means is released, said spacer means being positioned within the opening defined by the frame for limiting the degree to which the frame is compressed while being operatively pressed against the component.

2. The invention of claim 1, wherein the spacer means permits limited elastic deformation of the frame member by the clamping means and substantially prevents plastic deformation of the frame member by the clamping means over time.

3. The invention of claim 1, wherein the spacer means is slightly smaller in depth than the frame member, and allows the frame to become slightly compressed.

4. The invention of claim 3, wherein the spacer means permits limited elastic deformation of the frame member by the clamping means and substantially prevents plastic deformation of the frame member by the clamping means over time.

5. The invention of claim 4, wherein:
    the tension member further comprises a bolt,
    the clamping means further comprises a head formed on the bolt and a first nut threaded on the end portion of the bolt opposite the head, and
    the spacer means further includes a second nut threaded onto the bolt, and positioned within the opening defined by the frame for limiting the degree to which the frame can be compressed while being pressed against the compartment.

6. The invention of claim 5, wherein the second nut is slightly smaller in depth than the frame member, and allows the frame to become slightly compressed.

7. The invention of claim 6, wherein:
the component further comprises a transaxle,
a module plate member is carried by the bolt,
the module plate and transaxle are securely pressed between the second nut and the head of the bolt,
said module plate and transaxle being removable from the frame as a single unit when the first nut is removed from the bolt, said module plate and transaxle remaining operatively coupled together between the second nut and the head of the bolt.

8. The invention of claim 7, and further comprising a clamp plate member carried by the bolt between the first nut and the frame for spreading the compressive force of the first nut to the frame.

9. The invention of claim 1, wherein
the clamping means includes a first nut threaded onto the tension member, and
a module plate is carried by the tension member, said module plate, frame member and component being operatively pressed together by the clamping means, said frame member being removable from the module plate and component when the first nut is removed from the tension member, said module plate and component remaining securely pressed together between the spacer means and a portion of the clamping means when the first nut is removed.

10. A mechanism for coupling a component to a frame made of a plastic material, said mechanism comprising:
a bolt received by generally aligned openings in the frame and the component for securing the frame against the component, said bolt having a threaded portion and a head portion,
a first nut threaded onto the bolt for operatively pressing the frame and component toward each other,
spacer means carried by the bolt between the first nut and the head of the bolt, said spacer means being positioned within the opening in the frame for limiting the degree to which the frame can be compressed while being operatively pressed against the component, and
said first nut being threaded onto the bolt with sufficient tightness to generally prevent relative rotation and motion between the component and frame.

11. The invention of claim 10, wherein the spacer means further comprises a second nut threaded onto the bolt between the first nut and the head of the bolt.

12. A mechanism, comprising:
a vehicle frame made of a plastic material, said frame having vehicle components coupled therewith,
a bolt received by generally aligned openings defined by the frame and the component, said bolt having a head portion and a threaded portion,
a first nut threaded onto the bolt for securely pressing the frame and component together,
a spacer means threaded onto the bolt for securely remaining in position with respect to the bolt when the first nut is released, said spacer means being carried by the bolt between the first nut and the component and within the opening in the frame for limiting the travel of the nut on the threads toward the head of the bolt, and for limiting the degree to which the frame is compressed while being operatively pressed against the component.

13. The invention of claim 12, wherein the spacer means permits limited elastic deformation of the frame and substantially prevents plastic deformation of the frame over time.

14. The invention of claim 12, wherein the spacer means is slightly smaller in depth than the frame member, and allows the frame to become slightly compressed.

15. The invention of claim 14, wherein the spacer means permits limited elastic deformation of the frame and substantially prevents plastic deformation of the frame over time.

16. The invention of claim 12, wherein the spacer means further comprises a second nut threaded onto the bolt between the first nut and the head of the bolt.

17. The invention of claim 16, wherein:
the component further comprises a transaxle,
a module plate member is carried by the bolt,
the module plate and transaxle are securely pressed between the second nut and the head of the bolt,
said module plate and transaxle being removable from the frame as a single unit when the first nut is removed from the bolt, said module plate and transaxle remaining operatively coupled together between the second nut and the head of the bolt.

18. The invention of claim 16, and further comprising a clamp plate member carried by the bolt between the first nut and the frame for spreading the compressive force of the first nut to the frame.

19. A mechanism, comprising:
a frame member made at least partially of a plastic material, and to which a component may be coupled, said component and frame defining respective generally aligned openings,
a tension member received by the openings in the component and frame, said tension member including a clamping means for operatively pressing the frame and component securely together,
spacer means carried within the opening defined by the frame for limiting the degree to which the frame is compressed while being operatively pressed against the component, said spacer means permitting limited elastic deformation of the frame member by the clamping means for substantially preventing plastic deformation of the frame member by the clamping means over time, and
said tension member, clamping means, spacer means, frame and component forming a coupling sufficiently rigid to generally prevent relative rotation and motion between the frame and the component.

20. The invention of claim 19, wherein the spacer means is slightly smaller in depth than the frame member, and allows the frame to become slightly compressed.

21. The invention of claim 20, wherein the spacer means permits limited elastic deformation of the frame member by the clamping means and substantially prevents plastic deformation of the frame member by the clamping means over time.

22. The invention of claim 21, wherein:
the tension member further comprises a bolt,
the clamping means further comprises a head formed on the bolt and a first nut threaded on the end portion of the bolt opposite the head, and
the spacer means further includes a second nut threaded onto the bolt, and positioned within the opening defined by the frame for limiting the degree to which the frame can be compressed while being pressed against the compartment.

23. A mechanism, comprising:
a frame member made at least partially of a plastic material, and to which a component may be coupled, said component and frame defining respective generally aligned openings,
a bolt means in tension during operation and received by the openings in the component and frame, said bolt means further including a head formed on the bolt means and a first nut threaded on the end portion of the bolt means opposite the head, said head and first nut serving to clamp and operatively press the frame and component together securely, and
spacer means carried within the opening defined by the frame for limiting the degree to which the frame is compressed while being operatively pressed against the component, wherein the spacer means is slightly smaller in depth than the frame member, and allows the frame to become slightly compressed, said spacer means permitting limited elastic deformation of the frame member between the head and first nut and substantially prevent plastic deformation of the frame member by the clamping means between the head and first nut over time,
said spacer means further comprising a second nut threaded onto the bolt means.

24. A mechanism, comprising:
a frame member made at least partially of a plastic material, and to which a component may be coupled, said component and frame defining respective generally aligned openings,
a bolt means in tension during operation and received by the openings in the component and frame, said bolt means further including a head formed on the bolt means and a first nut threaded on the end portion of the bolt means opposite the head, said head and the first nut serving to clamp and operatively press the frame and component together securely, and
spacer means carried within the opening defined by the frame for limiting the degree to which the frame is compressed while being operatively pressed against the component, wherein the spacer means is slightly smaller in depth than the frame member, and allows the frame to become slightly compressed, said spacer means permitting limited elastic deformation of the frame member between the head and first nut and substantially prevents plastic deformation of the frame member by the clamping means between the head and first nut over time,
said spacer means further comprising a second nut threaded onto the bolt means, said second nut being slightly smaller in depth than the frame member for allowing the frame to become slightly compressed.

25. A mechanism, comprising:
a frame member made at least partially of a plastic material, and to which a transaxle may be coupled, said transaxle and frame defining respective generally aligned openings,
a bolt means in tension during operation and received by the openings in the transaxle and frame, said bolt means further including a head formed on the bolt means and a first nut threaded on the end portion of the bolt means opposite the head, said head and first nut serving to clamp and operatively press the frame and transaxle together securely, and
spacer means carried within the opening defined by the frame for limiting the degree to which the frame is compressed while being operatively pressed against the transaxle, wherein the spacer means is slightly smaller in depth than the frame member, and allows the frame to become slightly compressed, said spacer means permitting limited elastic deformation of the frame member between the head and first nut and substantially prevents plastic deformation of the frame member by the clamping means between the head and first nut over time,
said spacer means further comprising a second nut threaded onto the bolt means, said second nut being slightly smaller in depth than the frame member for allowing the frame to become slightly compressed, and
a module plate member also being carried by the bolt, the module plate and transaxle being securely pressed between the second nut and the head of the bolt, said module plate and transaxle being removable from the frame as a single unit when the first nut is removed from the bolt, said module plate and transaxle remaining operatively coupled together between the second nut and the head of the bolt when said first nut is removed from the bolt.

26. A mechanism, comprising:
a frame member made at least partially of a plastic material, and to which a transaxle may be coupled, said transaxle and frame defining respective generally aligned openings,
a bolt means in tension during operation and received by the openings in the transaxle and frame, said bolt means further including a head formed on the bolt means and a first nut threaded on the end portion of the bolt means opposite the head, said head and first nut serving to clamp and operatively press the frame and transaxle together securely, and
spacer means carried within the opening defined by the frame for limiting the degree to which the frame is compressed while being operatively pressed against the transaxle, wherein the spacer means is slightly smaller in depth than the frame member, and allows the frame to become slightly compressed, said spacer means permitting limited elastic deformation of the frame member between the head and first nut and substantially prevents plastic deformation of the frame member by the clamping means between the head and first nut over time,
said spacer means further comprising a second nut threaded onto the bolt means, said second nut being slightly smaller in depth than the frame member for allowing the frame to become slightly compressed,
a module plate member also being carried by the bolt, the module plate and transaxle being securely pressed between the second nut and the head of the bolt, said module plate and transaxle being removable rom the frame as a single unit when the first nut is removed from the bolt, said module plate and transaxle remaining operatively coupled together between the second nut and the head of the bolt when said first nut is removed from the bolt, and a clamp plate member carried by the bolt between the first nut and the frame for spreading the compressive force of the first nut to the frame.

27. A mechanism for coupling a component to a frame made of a plastic material, said mechanism comprising:
- a bolt received by generally aligned openings in the frame and the component for securing the frame against the component, said bolt having a threaded portion and a head portion,
- a first nut threaded onto the bolt for operatively pressing the frame and component toward each other, and
- a second nut threaded onto the bolt between the first nut and the head of the bolt, said second nut being positioned within the opening in the frame for limiting the degree to which the frame can be compressed while being operatively pressed against the component.

28. A mechanism, comprising:
- a vehicle frame made of a plastic material, said frame having vehicle components coupled therewith,
- a bolt received by generally aligned openings defined by the frame and the component, said bolt having a head portion and a threaded portion,
- a first nut threaded onto the bolt for securely pressing the frame and component together,
- a second nut threaded onto the bolt between the first nut and the component and within the opening in the frame for limiting the travel of the nut on the threads toward the head of the bolt, and for limiting the degree to which the frame is compressed which being operatively pressed against the component.

29. A mechanism, comprising:
- a vehicle frame made of a plastic material, said frame having a vehicle transaxle coupled therewith,
- a bolt received by generally aligned openings defined by the frame and the transaxle, said bolt having a head portion and a threaded portion,
- a first nut threaded onto the bolt for securely pressing the frame and transaxle together,
- a spacer means carried by the bolt between the first nut and the transaxle and within the opening in the frame for limiting the travel of the nut on the threads toward the head of the bolt, and for limiting the degree to which the frame is compressed while being operatively pressed against the transaxle, said spacer means further comprising a second nut threaded onto the bolt between the first nut and the head of the bolt,
- a module plate carried by the bolt,
- the module plate and transaxle are securely pressed between the second nut and the head of the bolt, and
- said module plate and transaxle being removable from the frame as a single unit when the first nut is removed from the bolt, said module plate and transaxle remaining operatively coupled together between the second nut and the head of the bolt when the first nut is removed from the bolt.

30. A mechanism, comprising:
- a vehicle frame made of a plastic material, said frame having vehcile components coupled therewith,
- a bolt received by generally aligned openings defined by the frame and the component, said bolt having a head portion and a threaded portion,
- a first nut threaded onto the bolt for securely pressing the frame and component together,
- a second nut threaded onto the bolt between the first nut and the component and within the opening in the frame for limiting the travel of the nut on the threads toward the head of the bolt, and for limiting the degree to which the frame is compressed while being operatively pressed against the component, and
- a clamp plate member carried by the bolt between the first nut and the frame for spreading the compressive force of the first nut to the frame.

* * * * *

UNITED STATES PATENT AND TRADEMARK OFFICE
CERTIFICATE OF CORRECTION

PATENT NO. : 5,181,688

DATED : 26 January 1993

INVENTOR(S) : Hutchison et al.

It is certified that error appears in the above-identified patent and that said Letters Patent is hereby corrected as shown below:

Column 8, line 64, delete "rom" and insert therefor --from--.

Column 9, line 33, delete "which" and insert therefor --while--.

Column 10, line 24, delete "vehcile" and insert therefor --vehicle--.

Signed and Sealed this

Twenty-eighth Day of December, 1993

Attest:

BRUCE LEHMAN

Attesting Officer     Commissioner of Patents and Trademarks